United States Patent [19]
Buckreuß

[11] Patent Number: 5,327,140
[45] Date of Patent: Jul. 5, 1994

[54] METHOD AND APPARATUS FOR MOTION COMPENSATION OF SAR IMAGES BY MEANS OF AN ATTITUDE AND HEADING REFERENCE SYSTEM

[75] Inventor: Stefan Buckreuß, Müchen, Fed. Rep. of Germany

[73] Assignee: Deutsche Forschungsanstalt für Luft- und Raumfahrt e.V., Köln, Fed. Rep. of Germany

[21] Appl. No.: 98,926

[22] Filed: Jul. 29, 1993

[30] Foreign Application Priority Data

Jul. 31, 1992 [DE] Fed. Rep. of Germany ....... 4225413

[51] Int. Cl.$^5$ .............................................. G01S 13/90
[52] U.S. Cl. ...................................... 342/25; 342/161; 342/162
[58] Field of Search ................. 342/25, 159, 161, 162, 342/194, 197

[56] References Cited

U.S. PATENT DOCUMENTS

| | | | |
|---|---|---|---|
| 4,034,370 | 7/1977 | Mims | 342/25 |
| 4,387,373 | 6/1983 | Longuemare, Jr. | 342/25 |
| 4,724,418 | 2/1988 | Weindling | 342/25 |
| 4,851,848 | 7/1989 | Wehner | 342/25 |
| 4,963,877 | 10/1990 | Wood et al. | 342/25 |
| 5,051,750 | 9/1991 | Hollister | 342/26 |
| 5,053,772 | 10/1991 | Lamper et al. | 342/25 |
| 5,055,850 | 10/1991 | Lamper | 342/201 |
| 5,243,349 | 9/1993 | Mims | 342/25 |

*Primary Examiner*—John B. Sotomayor
*Attorney, Agent, or Firm*—Browdy and Neimark

[57] ABSTRACT

For motion compensation of SAR images by means of an attitude and heading reference system a mean track angle ($\psi_T$) flight is selected as desired flight direction;

an acceleration ($a_x''(t)$) is turned through a drift angle ($\psi_D$) in the direction of a desired flight path;

the speed ($v_{xo}'(t)$) in the desired flight direction is calculated from a ground speed ($v_G(t)$);

a variation of the relative speed ($v_x'(t)$) in the desired flight direction is calculated by an integration of the acceleration ($a_x(t)$);

a relative change of the across heading horizontal position ($P_y(t)$) is calculated by a double integration of the across heading horizontal acceleration ($a_y'(t)$), and an actual slant range of the aircraft to an illuminated terrain strip ($R_i'(t)$) is calculated for each range gate in a manner known per se.

4 Claims, 7 Drawing Sheets

METHOD AND APPARATUS FOR MOTION COMPENSATION OF SAR IMAGES BY MEANS OF AN ATTITUDE AND HEADING REFERENCE SYSTEM

BACKGROUND OF THE INVENTION

1. Field of the Invention

The invention relates to a method and an apparatus for motion compensation of SAR images by means of an attitude and heading reference system.

2. Description of the Prior Art

An aircraft-borne radar system with synthetic aperture (SAR) operated by Applicants operates in the L, C and X band. Such radar systems are employed for imaging the earth's surface along the flight path. The antenna is aligned perpendicularly to the flight direction slanting downwardly, as indicated schematically in FIG. 8. This gives a land map, the image dots of which represent the radar reflectivity of the objects on the ground.

Generally, when processing a radar image ideal flight conditions are presumed, i.e. the heading, position and forward speed are assumed to be constant. However, in practice this is not true because the aircraft is deflected from its nominal flight path by turbulences and also varies in its forward speed. Deviations from the altitude and laterally of the flight direction result in a variation of the slant range between the antenna and an illuminated target on the ground and therefore influence the phase history of a backscatter signal. In addition, the varying forward speed prevents an equidistant scanning of the illuminated terrain strip. The motion errors also impair the azimuth compression and lead to a loss of quality of the radar images processed, resulting in geometrical distortions, reduction of the resolution and a decrease in the contrast.

Various methods are known for motion compensation. In a motion compensation having a master/slave system two inertial navigation systems (INS) are employed, the slave system being mounted in the vicinity of the antenna and the master system usually in the aircraft nose. The slave system is employed for short-time stable measurements whilst long-time stable measurements are carried out by means of the master system; the two measurements are then linked via a so-called Kalman filter.

A disadvantage of a motion compensation by means of a master/slave INS system is that the slave system is simply constructed and, as already stated, can be employed only for short-time measurements. In the case of long-time measurements, sensor errors produce a drift in the position computation. The slave system must therefore be supported by a long-time stable master system which however generally is part of an aircraft navigation system and as explained above located in the nose of the aircraft.

As a result, there is usually a long lever arm between the INS system and an antenna phase centre and this arm must be compensated in the calculations. With a very long lever arm, extremely high demands are made of the angular resolution of the inertial sensor and they cannot be met by any INS system. The master INS system alone can therefore be employed for movement compensation only with limited accuracy; simultaneously, the calculation of the Kalman filters for supporting the slave INS system is very complicated and additionally requires a correspondingly complex software and hardware.

Using global positioning systems (GPS systems) for motion compensation permits an accurate determination of the position and speed. In particular, a differential GPS system is suitable for movement compensation. However, a disadvantage of motion compensation methods involving such a GPS system is that it is dependent on support by a ground station. This firstly makes the operating costs very high and secondly leads to restrictions in the choice of the area of use. GPS motion data are however not accurate enough without a ground station.

In an autofocus method for motion compensation radar raw data are evaluation and normally only used for estimating the forward speed of the carrier. The autofocus method requires however a very high computing expenditure and consequently in real time systems makes high demands of the hardware. In addition, the bandwidth and accuracy with the autofocus method is not very high and with relatively large motion errors the compensation of the speed error alone is no longer enough to produce good image quality.

With motion compensation by means of the so-called reflectivity displacement method, the azimuth spectrum of the radar raw data is evaluated; this makes it possible to determine the forward speed and a phase error. A motion compensation is then carried out with this information. In the reflectivity displacement method as well a high computing expenditure is required.

Consequently, in real time this method can be implemented only by means of computers running in parallel. Furthermore, the bandwidth is limited and the separation of the speed and phase information presents problems when relatively large disturbance movements are involved.

SUMMARY OF THE INVENTION

The object of the invention is therefore to improve the image quality by providing a method and apparatus for motion compensation of SAR images in which from measurement data of an inertial attitude and heading reference systems phase errors are corrected and a pulse repetition frequency regulated.

The invention therefore proposes in a method and apparatus for generating high quality SAR images and for motion compensation of SAR images by means of an attitude and heading reference system the improvement wherein as desired flight direction a mean track angle ($\psi_T$) arising during a measurement flight is selected;

an acceleration ($a_x''(t)$) is turned through a drift angle ($\psi_D$) in the direction of a desired flight path, thereby giving an acceleration ($a_x'(t)$);

the speed ($v_{xo}'(t)$) in the desired flight direction is calculated from a ground speed ($v_G(t)$) in that the ground speed ($v_G(t)$) is projected onto the desired flight direction on deviation from the latter;

a variation of the relative speed ($v_x'(t)$) in the desired flight direction is calculated by an integration of the acceleration in the desired flight direction ($a_x'(t)$) and before and after the integration the constant component of the signal and thus then the absolute forward speed ($v_x(t)$) is calculated by addition of a constant mean forward speed ($v_{xo}(t)$) to the speed ($v_x'(t)$) in the desired direction;

a relative change of the across hearing horizontal position ($p_y(t)$) is calculated by a double integration of the across heading horizontal acceleration ($a_y'(t)$), and before and after each integration the constant component of the signal is subtracted;

a relative change of a vertical position ($p_z'(t)$) is calculated by a double integration of the vertical acceleration ($a_z(t)$), and before and after each integration the constant component of the signal is subtracted and absolute vertical position ($p_z(t)$) is calculated by addition of a mean altitude over ground to the vertical position ($p_z'(t)$), and an actual slant range of the aircraft from an illuminated terrain strip ($R_i'(t)$) is calculated for each range gate in a manner known per se.

The invention also proposes in an apparatus for carrying out this method the improvement comprising a means for generating a rotational matrix and for computing an acceleration ($a_x'(t)$) in the desired flight direction from the along heading horizontal acceleration ($a_x''(t)$) with the aid of a drift angle ($\psi_D(t)$);

a means for computing a velocity ($v_x(t)$) in the desired flight direction, said means comprising a summation unit having a mean-forming unit associated therewith for generating a mean-free track angle ($\psi_T'(t)$), a unit following the summation unit for computing the cosine of the applied track angle ($\psi_T'(t)$), said cosine ($\cos\psi_T'$) being multiplied by a velocity ($v_G(t)$) over ground in a multiplying unit, from the output signal ($v_{xo}'(t)$) of which in a second mean-forming unit a mean speed signal ($\overline{v_{xo}(t)}$) is generated, a further summation unit having a third mean-forming unit by which from the acceleration signal ($a_x'(t)$) of the first means a mean-free acceleration ($a_x(t)$) is generated, an integrator following the second summation unit for computation of a speed ($v_x''(t)$) and a third summation unit following the integrator and having a fourth mean-forming unit associated therewith for generating a mean-free speed ($v_x'(t)$) which together with the output signal ($\overline{v_{xo}(t)}$) of the first mean-forming unit to a fourth summation unit, the output signal of which is then the speed ($v_x(t)$) in the desired flight direction;

a means for computing a relative across heading horizontal displacement ($p_y(t)$) which for generating an across heading mean-free acceleration ($a_y(t)$) comprises a fourth summation unit having a fifth mean-forming unit associated therewith and a second integrator following the fourth summation unit for computing a speed ($v_y'(t)$) which for generating a mean-free speed ($v_y(t)$) is applied to a fifth summation unit having a sixth mean-forming unit associated therewith, from the output signal ($v_y(t)$) of which in a third integrator a position ($p_y'(t)$) is calculated, a mean-free position ($p_y(t)$) being generated from said value ($p_y'(t)$) in a sixth summation unit having a seventh mean-forming unit associated therewith;

a means for computing a vertical position ($p_z(t)$) which comprises for generating a mean-free acceleration ($a_z(t)$) from a vertical acceleration ($a_z'(t)$) a seventh summation unit having an eighth mean-forming unit associated therewith, a following fourth integrator for computing a speed ($v_z'(t)$), an eighth summation unit having a ninth mean-forming unit associated therewith for generating a mean-free speed ($v_z(t)$), from which in a fifth integrator a vertical position ($p_z''(t)$) is computed which ($p_z''(t)$) for generating a mean-free relative position ($p_z'(t)$) is applied to a ninth summation unit having a tenth mean-forming unit associated therewith, from which position ($p_z'(t)$) by means of an eleventh summation unit the position ($p_z(t)$) is calculated in that to the other input of the summation unit the output signal ($p_{zo}$) of a tenth summation unit serving to comput the mean altitude over ground is applied, to the inputs of which in turn an altitude inertial signal ($p_{alt}(t)$) averaged by an eleventh mean-forming unit and a terrain level signal ($p_t(t)$) is applied, and thereafter in a manner known per se a computation of the actual slant range of the aircraft form an illuminated terrain strip ($R_i'(t)$) is carried out for each range gate.

In the method according to the invention, for carrying out a motion compensation the output data of an attitude and heading reference system are employed which is arranged as close as possible to the phase centre of the receiving antenna. The attitude and heading reference system used according top the invention does not cooperate in the master slave mode with another INS system but, as usual in inertial systems, is supplied with the magnetic heading, true air speed, barometer data and DME/VOR data. This makes it possible to calculate navigation data with high accuracy. The actual motion compensation parameters are calculated form the navigation data with the aid of the signal processing method of the invention and the apparatus for carrying out the method. This method operates with fast algorithms and the apparatus for carrying out the method can be implemented with a relatively low expenditure for software and hardware. The master/slave operation is nevertheless possible without changing the structure of the method applied. For the support, the ground speed and the altitude can be fed in without a Kalman filtering; it is also of no consequence which sensors furnish the data.

Since only an inertial system is employed, the method according to the invention is substantially more economical to implement than a method having a master/slave INS, can be realised with reduced expenditure for soft and hardware and is therefore far less prone to trouble. Also, the long-time accuracy is far higher than that of an unsupported slave system. Compared with the master system, which is usually part of an aircraft navigation system, the apparatus for carrying out the method according to the invention has the advantage that it can be arranged near the receiving antenna. Furthermore, with the method according to the invention the entire power scope of a master INS system need not be available. For motion compensation in an SAR system the power capacity of an attitude and heading reference system suffices, in which compared with a master INS system no positions need be calculated in degrees of longitude and latitude. For comparable accuracy, the use of an attitude and heading reference system is in any case substantially more economical.

If the attitude and heading reference system according to the invention is operated without VOR/DME support data, a completely self-sufficient mode of operation can be achieved. However, the attitude and heading reference system is then no longer able to compute the ground speed and the drift angle. Both these can however be made available by the reflectivity displacement method (DE 39 22 428). The apparatus for carrying out the method according to the invention is thus independent of GPS and/or VOR/DME ground stations and the reception conditions for GPS satellites.

An advantage compared with the method involving autofocus is that apart from the speed the position is determined with high bandwidth and accuracy. As already explained, the signal processing method according to the invention operates with relatively simple but fast algorithms which are easy to implement and moreover do not involve very high computing expenditure.

Compared with the reflectivity displacement method, with the method according to the invention and the apparatus for implementing said method a considerably lower computing expenditure is necessary and consequently considerably less software and hardware. In addition, separate computation of the forward speed and position does not represent a problem and furthermore the bandwidth of the method is substantially greater.

BRIEF DESCRIPTION OF THE DRAWINGS

The invention will be described hereinafter in more detail with the aid of preferred embodiments and reference to the accompanying drawings, wherein.

DESCRIPTION OF THE PREFERRED EMBODIMENTS

Figure 1:
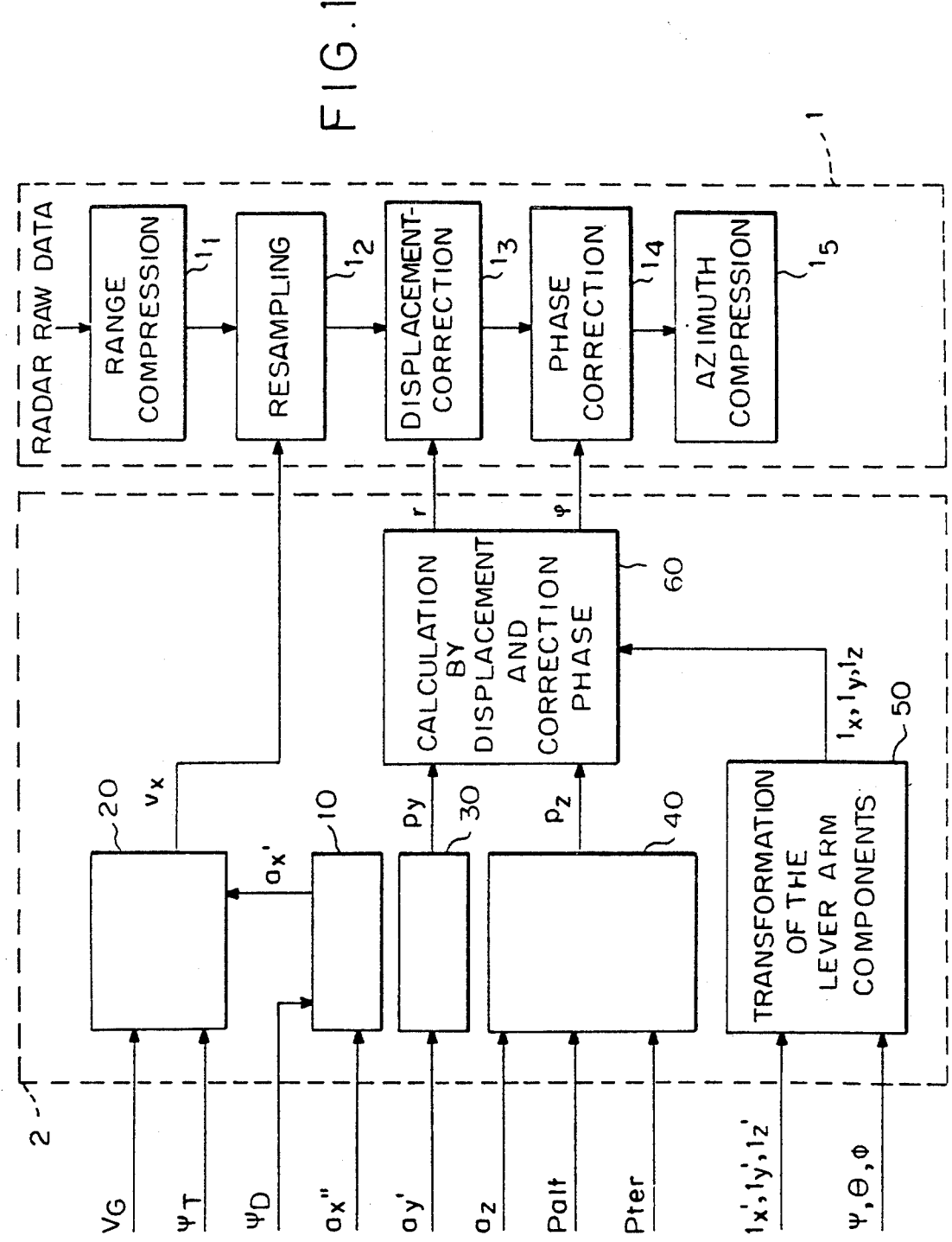
FIG. 1 shows in the form of a schematic block diagram a basic sequence of an SAR data processing with compensation of movement errors.

The symbols in FIG. 1 denote the following:

| | |
|---|---|
| $a_x''$ | along heading horizontal acceleration; |
| $a_y''$ | across heading horizontal acceleration; |
| $a_z''$ | vertical acceleration; |
| x', y', z' | lever arm components in the aircraft coordinate system; |
| x' y' z | lever arm components in the ground coordinate system; |
| $p_y$ | across heading displacement |
| $p_z$ | vertical position (= time profile of the altitude above ground) |
| $p_{alt}$ | barometrically supported altitude (altitude inertial) |
| $p_{ter}$ | terrain level |
| r | displacement in the antenna line of sight |
| $v_G$ | ground velocity |
| $v_x$ | along track velocity |
| $\phi$ | roll angle |
| $\theta$ | pitch angle |
| $\psi$ | yaw angle |
| $\psi_P$ | magnetic heading in conjunction with the angle measurement of the inertial system (platform heading) |
| $\psi_D$ | drift angle |
| $\psi_T$ | track angle, i.e. course over ground, "map heading" |
| $\zeta$ | correction phase |

For energy reasons, a radar system does not emit pulses in the true sense by frequency-modulated signals with square phase history, so-called chirps, which after reception are correlated with an identical function. In SAR technique this is referred to as range compression (block $l_1$ in FIG. 1).

A change in the forward speed $v_x$ results in the illuminated terrain strip no longer being equidistantly scanned by a pulse repetition frequency (PRF) of the radar. During flight over said terrain this can be compensated by an on-line follow-up regulation of the pulse repetition frequency. A resampling must then be carried out off-line (block $l_2$), i.e. an interpolation and another scanning of the radar raw data.

Apart from a phase error, displacement in the slant range also results in an erroneous location of the backscatter signal to the corresponding range gates. This effect is eliminated by a displacement correction (block $l_3$) by additional time delay of the radar echo before a phase correction.

A radar backscatter signal S(t) may be described in the following manner:

$$S(t)=A_0 \cdot e^{j\phi(t)} \cdot e^{j\phi_{err}(t)} \qquad (1)$$

where $A_0$ denotes the signal amplitude, (t) the nominal phase history and $\phi_{err}(t)$ the phase error which is caused by a deviation from a desired flight path. To correct a phase error the radar backscatter signal S(t) is multiplied by the conjugated complex phase error term $\exp[-j\phi_{err}(t)]$ (phase correction block $l_4$).

Due to the variation of the slant range when flying past an illuminated target the radar backscatter signal S(t) includes an approximately square phase history. By correlation of a backscatter signal with a previously calculatable function with the same phase history point target responses are then obtained in the azimuth direction, this being termed azimuth compression (block $l_5$).

Before computing a position with the aid of the signal processing method according to the invention, however, the coordinate system must first be defined. The position of an aircraft in the earth fixed coordinate system is continuously calculated from inertial data and related to the desired flight path, i.e. a new orthogonal coordinate system is created, the origin of which lies on the ground surface and marks the start of an image terrain strip. This new coordinate system is no longer aligned to the north and east but is related to the desired track of the aircraft. The desired track is the mean track over ground, the so-called mean track angle, which arises during a measurement flight.

The X axis runs on the ground surface along the desired flight path and is turned to the north direction through the mean track angle. The Y axis lies in the same plane perpendicular thereto whilst the Z axis is perpendicular to the latter plane. In the following considerations, which are true of an aircraft-borne SAR system, the curvature of the earth is not taken into account.

The positive axis direction and the positive rotation sense of the position angles in this coordinate system are defined as follows:

| | |
|---|---|
| X direction: | positive in the desired flight direction; |
| Y direction: | positive to the right of the desired flight direction; |
| Z direction: | positive upwardly; |
| pitch angle: | positive when the aircraft nose points upwards; |
| yaw angle: | positive when the aircraft nose points to the right; |
| roll angle: | positive when the right wing points |

It is further to be observed that in the following calculations a mean formation is frequently formed; thus, for example, the mean value of the time-dependent signal s(t) is denoted $\overline{s(t)}$, where:

$$\overline{s(t)} = \frac{1}{T} \int_0^T s(t)dt; \tag{2}$$

The alignment of the inertial system with respect to north is referred to as platform heading. If an aircraft is forced off its track by a side wind, the pilot will attempt to counteract drift by an appropriate correction angle. This makes it possible to maintain the desired heading; the platform heading and the true flight direction (i.e. the track angle ($\psi_T$)) are then however no longer identical. The difference between the track angle and the platform heading is referred to as drift angle $\psi_D$. The drift angle must be taken into account for converting an along heading horizontal acceleration $a_x''$ to an along track horizontal acceleration $a_x'$.

The along track acceleration $a_x'$, as apparent from FIG. 10, block 10, is calculated with the aid of the drift angle $\psi_D$ employing a rotational matrix represented by the following equation (3)

$$a_x' = a_x'' \cos\psi_D + a_y'' \sin\psi_D \tag{3}$$

Figure 2:
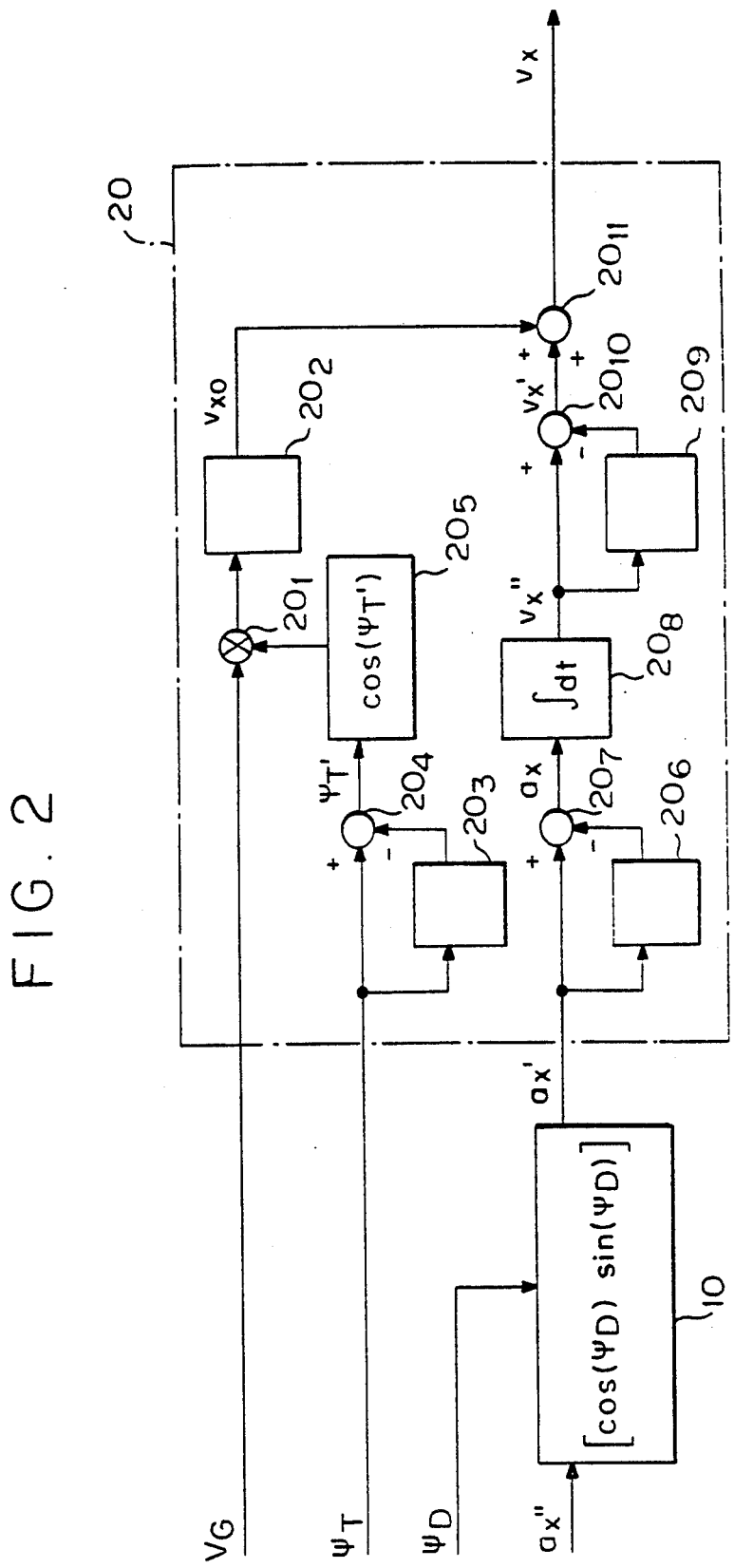
FIG. 2 shows schematically a detailed block diagram of an apparatus for computing the forward speed.

Using a means 20 in FIG. 1, the detailed construction of which is shown in FIG. 2, a speed $v_x(t)$ is calculated in the desired flight direction, i.e. the X direction; the speed $v_x(t)$ is made up of two components, that is a mean speed $\overline{v_{xo}(t)}$ and a relative speed change $v_x'(t)$. The mean speed $\overline{v_{xo}(t)}$ here, as apparent from the upper part of FIG. 2, is obtained from the objection of the ground speed $v_G(t)$ onto the X axis of the coordinate system related to the desired flight path in a multiplying unit $20_1$ and from a subsequent averaging in a mean-forming unit $20_2$. If a deviation from the mean track angle $\overline{\psi_T(t)}$ is present, the speed $v_G(t)$ over ground no longer corresponds to the speed in the X direction and the mean speed $\overline{v_{xo}(t)}$ must be determined in accordance with equations (4) and (5)

$$v_{xo}'(t) = v_G(t) \cdot \cos[\psi_T(t) - \overline{\psi_T(t)}] \tag{4}$$

and $$v_{xo} = \overline{v_{xo}'(t)} \tag{5}$$

To implement the two equations (4) and (5) the track angle $\psi_T(t)$ is applied directly to a summation unit $20_4$, by which a mean value generated by a first mean-forming unit $20_3$ is subtracted so that at the output thereof a mean-free track angle $\psi_T'(t)$ is present which for computing the cosine of the applied angle $\psi_T'(t)$ is applied to a cos $\psi_T'(t)$ calculating unit $20_5$. The output of the unit $20_5$ is then multiplied in a multiplying unit $20_1$ by the ground speed $v_G(t)$ so that at the output of the multiplying unit $20_1$ the speed $v_{xo}(t)$ is present which is applied to a cos $\psi_T'(t)$ calculating unit $20_5$ for calculating the cosine of the applied angle $\psi_T'(t)$. The output of the unit $20_5$ is then multiplied in a multiplying unit $20_1$ by the ground speed $v_G(t)$ so that the speed $v_{xo}(t)$ is available at the output of the multiplying unit $20_1$.

From the acceleration $a_x'(t)$ along the flight path the relative speed change $v_x'$ is calculated in that before and after an integration of the acceleration $a_x(t)$ by means of an integrator $20_8$ in accordance with the following equations (6) and (7)

$$v_x''(t) = \int_0^t [a_x'(t) - \overline{a_x'(t)}]dt \tag{6}$$

and $$v_x'(t) = v_x''(t) - \overline{v_x''(t)} \tag{7}$$

the constant $\overline{a_x'(t)}$ formed in the third mean-forming unit $20_6$ is removed from the signal $a_x'(t)$ in the summation unit $20_7$ and the constant component $\overline{v_x''(t)}$ which has been generated ion a fourth mean-forming unit $20_9$ is removed from the signal $v_x''(t)$ in a third summation unit $20_{10}$.

Thereafter, the relative speed change $v_x'(t)$ present at the output of the summation unit $20_{10}$ is added to the mean forward speed $\overline{v_{xo}(t)}$ in a summation unit $20_{11}$ in accordance with the following equation (8):

$$v_x(t) = v_x'(t) + v_{xo} \tag{8}$$

The profile of the forward speed $v_x(t)$ in the x direction is finally used for the so-called resampling (block $l_2$ in FIG. 1). There is a free choice of the sensor furnishing the ground speed $v_G(t)$. Apart from the inertial sensors mentioned, the global positioning system (GPS) and methods for evaluating a radar signal are particularly suitable.

Figure 3:
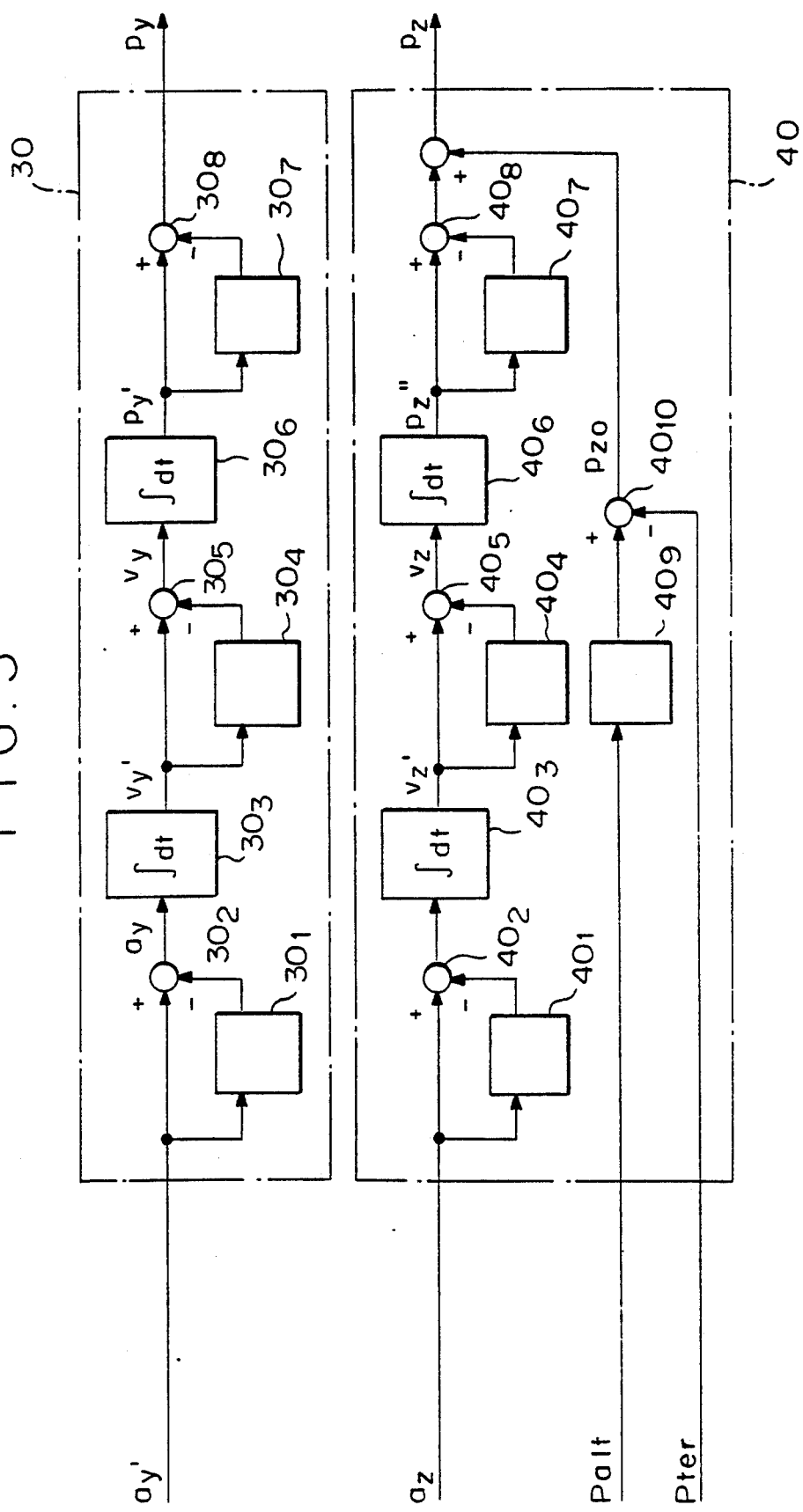
FIG. 3 shows schematically a detailed block diagram of an apparatus for computing the position.

To calculate the position in the Y direction, in FIG. 3 across track acceleration $a_y'(t)$ is integrated twice in second and third integrators $30_3$ and $30_6$. Before and after each integration the mean value $\overline{a_y'(t)}$ of the signal $a_y'(t)$ and the mean value $\overline{v_y'(t)}$ of the signal $v_y'(t)$ are formed in fifth and sixth mean-forming units $30_1$ and $30_4$ and in respective following summation units $30_2$ and $30_5$ subtracted from the respective signals $a_y'(t)$ and $v_y'(t)$ applied thereto. After integration of the signal $v_y'(t)$ in the integrator $30_6$ and subsequent mean value subtraction in a sixth summation unit $30_8$, in which the mean value generated in a seventh mean-forming unit $30_7$ has been subtracted, the relative change of the position $p_y(t)$ in the Y direction is obtained at the output of the summation unit $30_8$, as will be apparent from the following equations (9) to (12):

$$v_y'(t) = \int_0^t [a_y'(t) - \overline{a_y'(t)}]dt \tag{9}$$

$$v_y(t) = v_y'(t) - \overline{v_y'(t)} \tag{10}$$

$$p_y'(t) = \int_0^t v_y(t)dt \tag{11}$$

$$p_y(t) = p_y'(t) - \overline{p_y'(t)} \tag{12}$$

The position $p_z(t)$ in the Z direction or the profile of the altitude over ground ($p_z(t)$) is obtained by a double integration in fourth and fifth integrators $40_3$ and $40_6$ of the vertical acceleration $a_z(t)$ and the vertical speed $v_z(t)$ in accordance with the equations (13) to (17) given below:

$$v_z'(t) = \int_0^t [a_z(t) - \overline{a_z(t)}]dt \tag{13}$$

$$v_z(t) = v_z'(t) - \overline{v_z'(t)} \tag{14}$$

$$p_z''(t) = \int_0^t v_z(t)dt \tag{15}$$

$$p_z'(t) = p_z''(t) - \overline{p_z''(t)} \tag{16}$$

Here, before the first integration of the vertical acceleration $a_z(t)$ the mean value $\overline{a_z(t)}$ of the signal $a_z(t)$ generated in an eighth mean-forming unit $40_1$ is subtracted from the acceleration signal $a_z(t)$ in a seventh summation unit $40_2$. Furthermore, after integration of the fourth integrator $40_3$ the mean value $\overline{v_z'(t)}$ generated by a ninth mean-forming unit $40_4$ is subtracted from the integrator output signal $v_z'(t)$ in a following eighth summation unit $40_5$. Furthermore, in a ninth summation unit $40_8$ following the fifth integrator $40_6$ the mean value $\overline{p_z''(t)}$ generated by a tenth mean-forming unit $40_7$ is subtracted from the integrator output signal $p_z''(t)$. A the output of the ninth summation unit $40_8$ the relative altitude change $p_z'(t)$ is then available.

Now, to obtain the absolute altitude above ground, to this signal profile $p_z'(t)$ the mean altitude $\overline{p_{alt}(t)}$ generated in an eleventh mean-forming unit $40_9$ is added, and in a summation unit $40_{10}$ the terrain level $p_{ter}(t)$ is subtracted in accordance with the following equation (17):

$$p_z(t) = \overline{p_{alt}(t)} - p_{ter} + p_z'(t) \tag{17}$$

Possible sensors for determining the altitude $p_{alt}(t)$ are barometers, the GPS system and altimeters.

Figure 4:
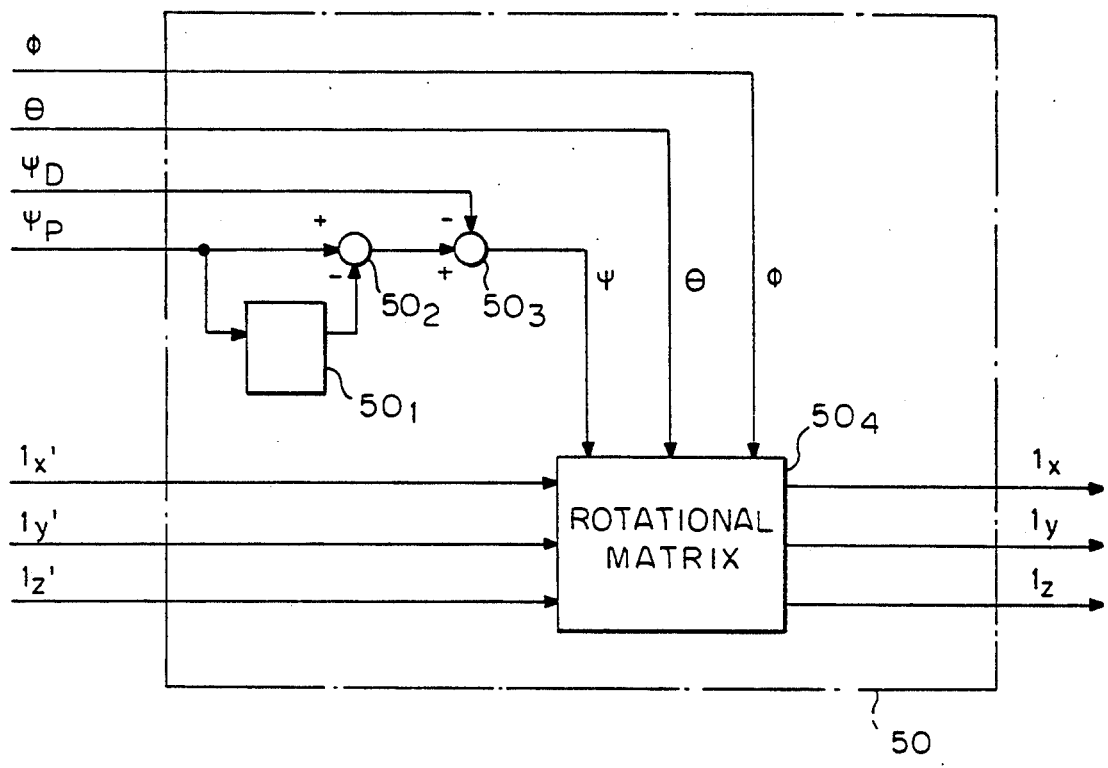
FIG. 4 shows schematically a detailed block diagram of an apparatus for transformation of lever arm components to ground components.
Figure 5:
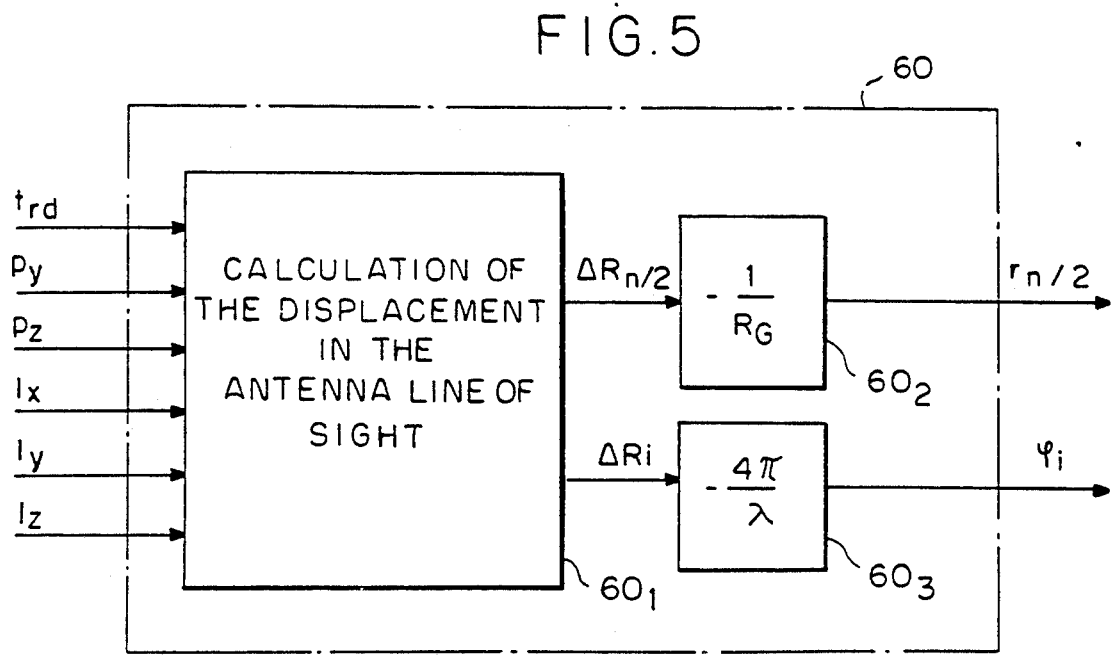
FIG. 5 shows schematically a detailed block diagram of an apparatus for calculating the displacement in the antenna viewing direction.

Since for space reasons, in practice the inertial measuring system can be accommodated and mounted only at a certain distance form the phase centre of the antenna, it is not possible to measure the movement of the antenna exactly at the location of the phase sensor. There is thus a lever arm between the antenna phase centre and the inertial system; the lever arm has constant components $l_x'$, $l_y'$ and $l_z'$. The lever arm must therefore be compensated with respect to the ground-fixed coordinate system related to the desired aircraft course. For this purpose the aforementioned lever arm components $l_x'$, $l_y'$ and $l_z'$ in the aircraft coordinate system are transformed by means of the rotational matrix $50_4$ given in the following equation (18) in FIG. 4 to lever arm components $l_x$, $l_y$ and $l_z$ of the ground-fixed coordinate system, the length of the lever arm components depending on the pitch angle $\theta(t)$, the yaw angle $\psi(t)$ and the roll angle $\phi(t)$ of the aircraft and therefore have to be continuously newly calculated using the means shown in FIG. 4.

$$\psi(t) = \psi_P(t) - \overline{\psi_P(t)} - \psi_D(t) \tag{19}$$

For this purpose, in a twelfth summation unit $50_2$ the mean value $\overline{\psi_P(t)}$ generated by a twelfth mean-forming unit $50_1$ is subtracted from the platform heading angle $\psi_P(t)$, the drift angle $\psi_D(t)$ being subtracted from the output value of the summation unit $50_2$ in a thirteenth summation unit $50_3$. Thus, the yaw angle $\psi(t)$ is then applied to the rotational matrix $50_4$ by the thirteenth summation unit $50_3$.

Figure 6:
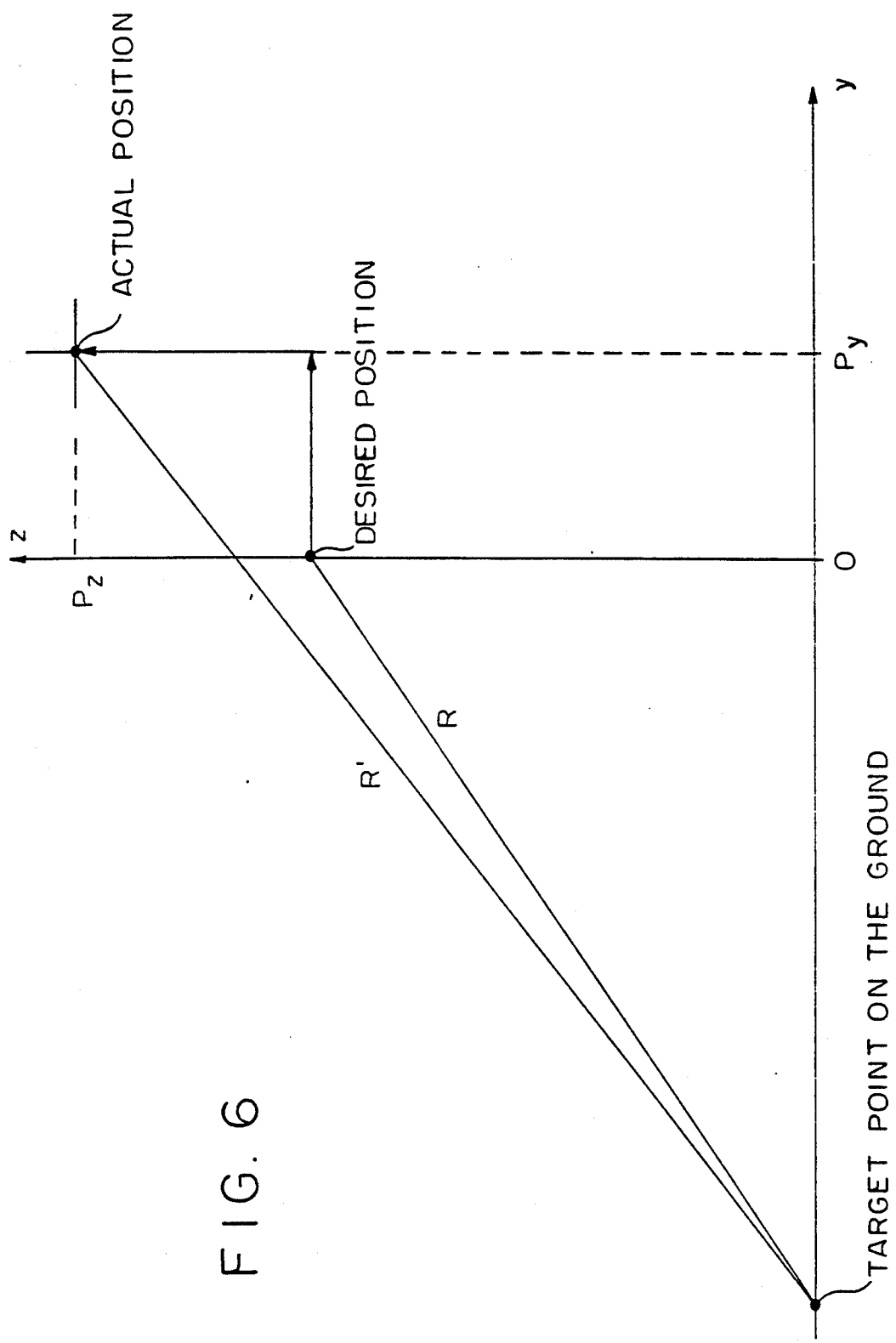
FIG. 6 shows schematically an illustration of a geometry of desired and actual slant range from a point on the ground.

As apparent from the schematic geometry illustration in FIG. 6, the position of the aircraft in the X, Y and Z coordinate system is subsequently employed for calculating an actual slant range $R'$ between an illuminated strip and compared with a desired slant range $R$. By the division of a range area into n range gates this step must be carried out n times after reception of an echo. The desired slant ranges for each range gate $R_i$ are obtained according to equation (20) as $$R_i = \tfrac{1}{2}\cdot c \cdot t_{rd} + R_G \cdot (i-1), \text{ mit } i = 1, 2, \ldots, n \tag{20}$$

where c denotes the velocity of light, $t_{rd}$ twice the transit time of the radar signal between the antenna and the nearest region of the illuminated terrain strip (range delay) and $R_G$ the length of a range gate. The actual slant range is obtained from the geometry shown in FIG. 6 and calculated taking account of the lever arm in accordance with equation (21):

$$R_i'(t) = \tag{21}$$
$$\sqrt{l_x(t)^2 + (\sqrt{R_i^2 - p_z(t)^2} + p_y(t) + l_y(t)) + [p_z(t) + l_z(t)]^2}$$

The position $p_y(t)$ and $p_z(t)$ in the Y and Z direction are obtained by equations (11) and (16) employing the means 30 and 40. The position in the X direction need not be taken into account because the resampling ($l_2$ in FIG. 1) manifests itself as if the aircraft were at the correct position in the X direction at any time.

The lever arm components $l_x$, $l_y$ and $l_z$ according to equation (18) originates from the rotational matrix $50_4$ of the means 50.

The slant range displacement for each range gate $\Delta R_i(t)$ is obtained according to equation (22) as $$\Delta R_i(t) = R_i - R_i'(t) \tag{22}$$

and is finally converted to phase values $\phi_i(t)$ according to equation (23)

$$\phi_i(t) = -\Delta R_i(t) \cdot 4\pi/\lambda \tag{23}$$

for each range gate in the multiplying unit $60_3$ and thus $$\begin{bmatrix} l_x \\ l_y \\ l_z \end{bmatrix} = \begin{bmatrix} \cos(\phi)\cos(\psi) & \sin(\phi)\sin(\theta)\cos(\psi) - \cos(\phi)\sin(\psi) & -\cos(\phi)\sin(\theta)\cos(\psi) - \sin(\phi)\sin(\psi) \\ \cos(\phi)\sin(\psi) & \sin(\phi)\sin(\theta)\sin(\psi) + \cos(\phi)\cos(\psi) & -\cos(\phi)\sin(\theta)\sin(\psi) + \sin(\phi)\cos(\psi) \\ \sin(\theta) & -\sin(\phi)\cos(\theta) & \cos(\phi)\cos(\theta) \end{bmatrix} \cdot \begin{bmatrix} l_x' \\ l_y' \\ l_z' \end{bmatrix} \tag{18}$$

The yaw angle $\psi(t)$ is determined from the drift angle $\psi_d(t)$ and a platform heading angle $\psi_P(t)$ in accordance with equation (19).

employed for the phase correction of raw data. In equation (23) $\lambda$ denotes the wavelength of the emitted radar signal.

Figure 7:
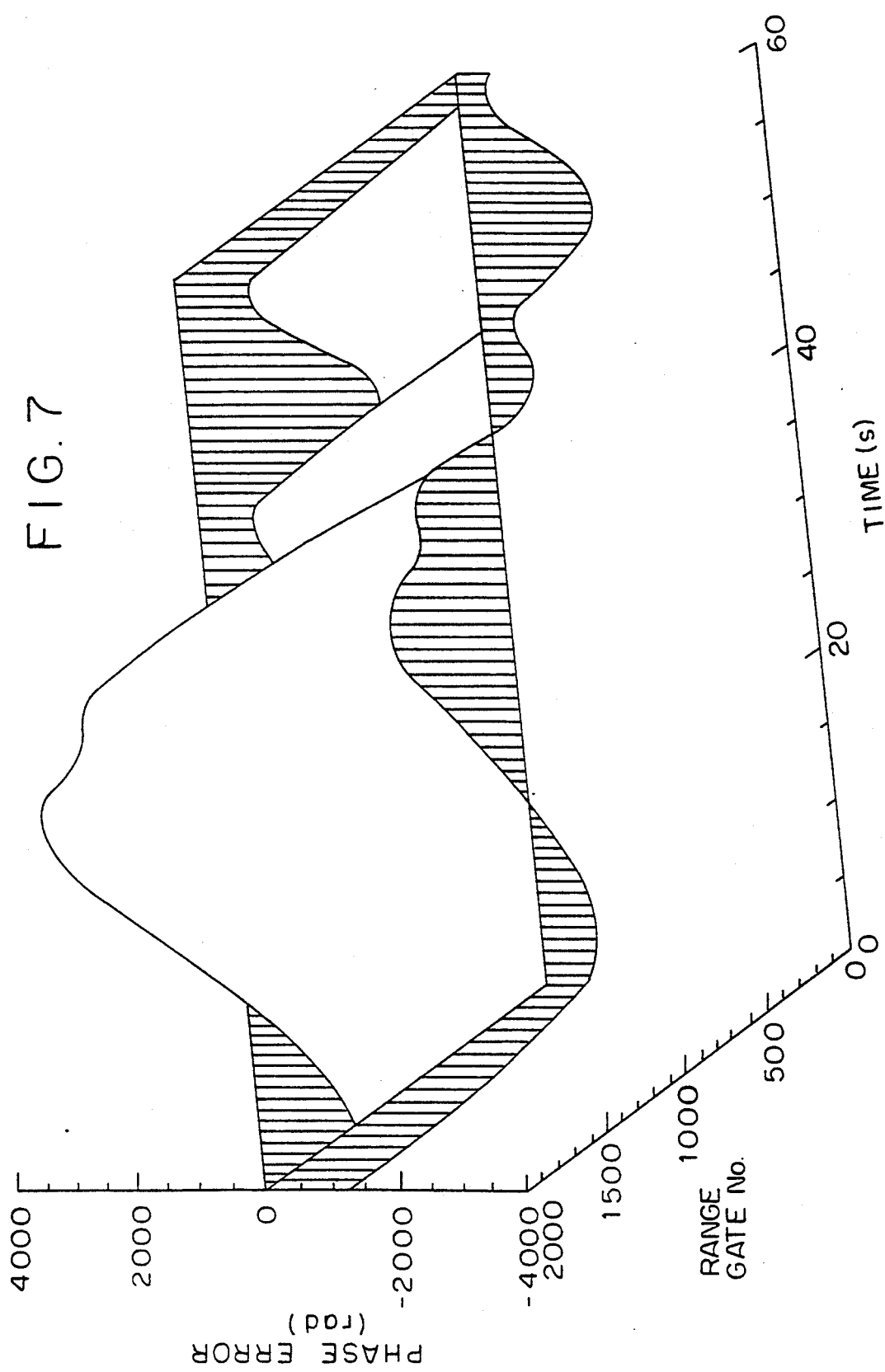
FIG. 7 shows schematically a perspective illustration of the time profile of the phase error according to FIG. 6 for each range gate.
Figure 8:
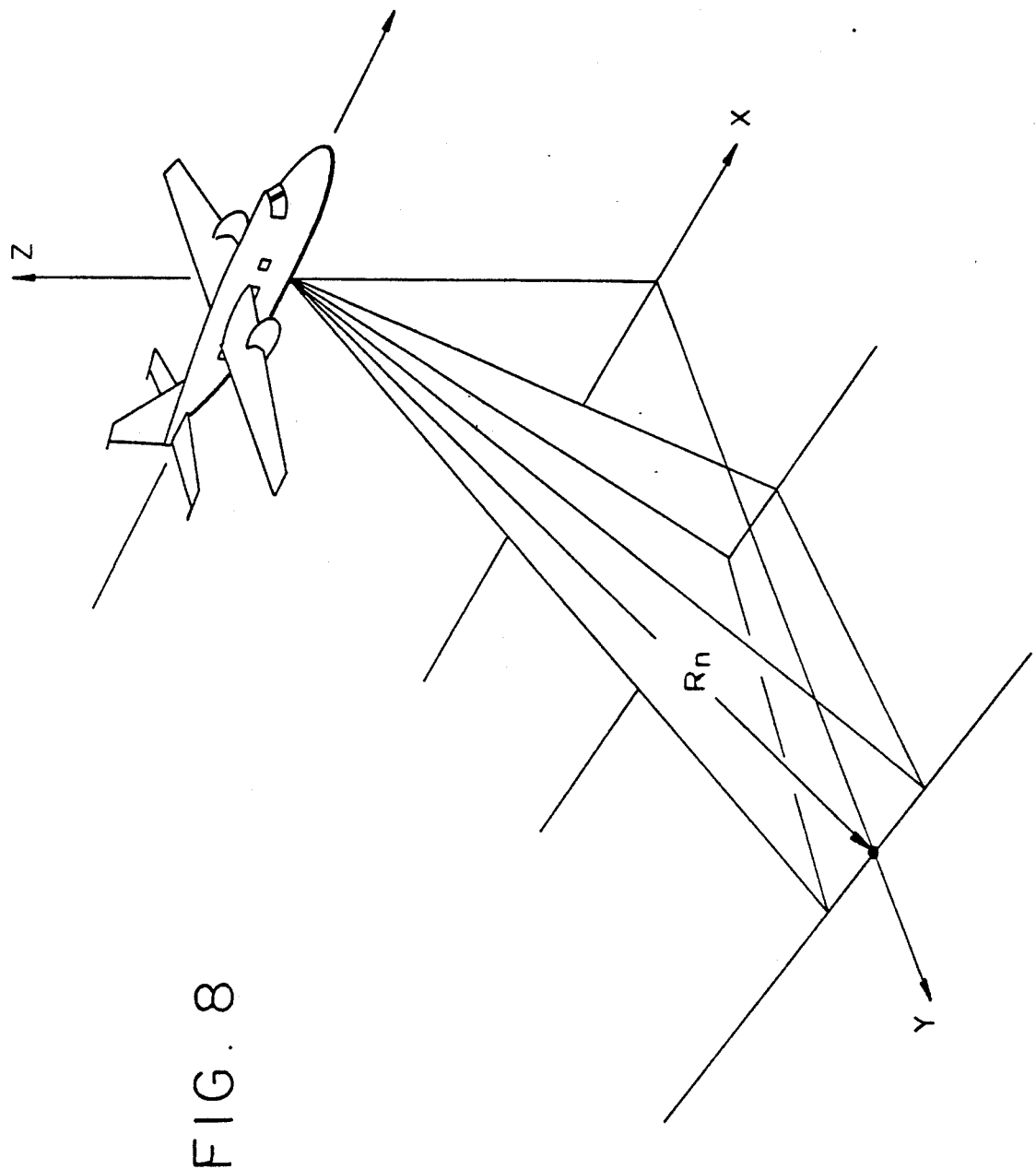
FIG. 8 shows a schematic illustration of an SAR aircraft geometry.

In a practical test of the motion compensation method, a measurement flight was carried out with yaw movements of about ±2° in order in this manner to deliberately generate a distorted SAR image. Furthermore, the measured data of the attitude and heading reference system were then used to compute the correction parameters. The SAR image created with the aid of the motion compensation method according to the invention exhibited a considerably better resolution in the azimuth direction, improved geometry trueness and a higher contrast than an uncompensated SAR image. In FIG. 7, for clarification the time profile of the calculated phase error for each range gate is represented in a perspective view, the time being plotted in s along the abscissa, the range gate number along the ordinate and the phase error in rad along the axis perpendicular to the abscissa and ordinate.

Furthermore, to improve the accuracy the motion compensation method according to the invention may also be employed in combination with an attitude and heading reference system and in lidar and sonar systems, as well as in conjunction with the reflectivity misalignment method according to DE 39 22 428.

I claim:

1. A method for motion compensation of SAR images by means of an attitude and heading reference system, wherein as desired flight direction a mean track angle ($\psi_T$) arising during a measurement flight is selected;

an acceleration ($a_x''(t)$) is turned through a drift angle ($\psi_D$) in the direction of a desired flight path, thereby giving an acceleration ($a_x'(t)$);

the speed ($v_{xo}'(t)$) in the desired flight direction is calculated form a ground speed ($v_G(t)$) in that the ground speed ($v_G(t)$) is projected on the desired flight direction on deviation from the latter;

a variation of the relative speed ($v_x'(t)$) in the desired flight direction is calculated by an integration of the acceleration in the desired flight direction ($a_x'(t)$) and before and after the integration the constant component of the signal and thus then the absolute forward speed ($v_x(t)$) is calculated by addition of a constant mean forward speed ($v_{xo}(t)$) to the speed ($v_x'(t)$) in the desired direction;

a relative change of the across heading horizontal position ($p_y(t)$) is calculated by a double integration of the across heading horizontal acceleration ($a_y'(t)$), and before and after each integration the constant component of the signal is substracted;

a relative change of a vertical position ($p_z'(t)$) is calculated by a double integration of the vertical acceleration ($a_z(t)$), and before and after each integration of the constant component of the signal is subtracted and the absolute vertical position ($p_z(t)$) is calculated by addition of a mean altitude over ground to the vertical position ($p_z'(t)$), and an actual slant range of the aircraft from an illuminated terrain strip ($R_i'(t)$) is calculated for each range gate in a manner known per se.

2. A method according to claim 1, wherein after the double integration of the vertical acceleration ($a_z(t)$) a compensation computation is made for a lever arm between the phase sensor of a receiving antenna of the radar and the inertial attitude and heading reference system in that the components ($l_x'$, $l_y'$, $l_z'$) thereof are transformed from the aircraft coordinate system to the earth fixed coordinate system, the lever arm components ($l_x$, $l_y$, $l_z$) thereby being obtained.

3. An apparatus for carrying out the method according to claim 1 comprising a means for generating a rotational matrix and for computing an acceleration ($a_x'(t)$) in the desired flight direction from the along heading horizontal acceleration ($a_x''(t)$) with the aid of a drift angle ($\psi_D(t)$);

a means for computing a velocity ($v_x(t)$) in the desired flight direction, said means comprising a summation unit having a mean-forming unit associated therewith for generating a mean-free tract angle ($\psi_T'(t)$), a unit following the summation unit for computing the cosine of the applied track angle ($\psi_T'(t)$), said cosine ($\cos\psi_T'$) being multiplied by a velocity ($v_G(t)$) over ground in a multiplying unit, from the output signal ($v_{xo}'(t)$) of which in a second mean-forming unit a mean speed signal ($\overline{v_{xo}(t)}$) is generated, a further summation unit having a third mean-forming unit by which from the acceleration signal ($a_x'(t)$) of the first means a mean-free acceleration ($a_x(t)$) is generated, an integrator following the second summation unit for computation of a speed ($v_x''(t)$) and a third summation unit following the integrator and having a fourth mean-forming unit associated therewith for generating a mean-free speed ($v_x'(t)$) which together with the output signal ($\overline{v_{xo}(t)}$) of the first mean-forming unit to a fourth summation unit, the output signal of which is then the speed ($v_x(t)$) in the desired flight direction;

a means for computing a relative across heading horizontal displacement ($p_y(t)$) which for generating an across heading mean-free acceleration ($a_y(t)$) comprises a fourth summation unit having a fifth mean-forming unit associated therewith and a second integrator following the fourth summation unit for computing a speed ($v_y'(t)$) which for generating a mean-free speed ($v_y(t)$) is applied to a fifth summation unit having a sixth mean-forming unit associated therewith, from the output signal ($v_y(t)$) of which in a third integrator a position ($p_y'(t)$) is calculated, a mean-free position ($p_y(t)$) being generated from said value ($p_y'(t)$) in a sixth summation unit having a seventh mean-forming unit associated therewith;

a means for computing a vertical position ($p_z(t)$) which comprises for generating a mean-free acceleration ($a_z(t)$) from a vertical acceleration ($a_z'(t)$) a seventh summation unit having an eighth mansforming unit associated therewith, a following fourth integrator for computing a speed ($v_z'(t)$), an eighth summation unit having a ninth mean-forming unit associated therewith for generating a mean-free speed ($v_z(t)$), from which in a fifth integrator a vertical position ($p_z''(t)$) is computed which ($p_z''(t)$) for generating a mean-free relative position ($p_z'(t)$) is applied to a ninth summation unit having a tenth mean-forming unit associated therewith, from which position ($p_z'(t)$) by means of an eleventh summation unit the position over ground ($p_z(t)$) is calculated in that to the other input of the summation unit the output signal ($p_{zo}$) of a tenth summation unit serving to comput the mean altitude over ground is applied, to the inputs of which in turn an altitude inertial signal ($p_{alt}(t)$) averaged by an eleventh mean-forming unit and a terrain level signal ($p_r(t)$) is applied, and thereafter in a manner known per se a computation of the actual slant range of the aircraft from an illuminated terrain strip ($R_i'(t)$) is carried out for each range gate.

4. An apparatus according to claim 3, comprising a means in which using a three-dimensional rotational matrix lever arm components ($l_x'$, $l_y'$, $l_z'$) of an aircraft coordinate system are transformed to lever arm components ($l_x$, $l_y$, $l_z$) of the ground coordinate system in that apart from the lever arm components ($l_x'$, $l_y'$, $l_z'$) the roll angle ($\phi(t)$), the pitch angle ($\phi(t)$) and a yaw angle ($\psi(t)$) are applied to the rotational matrix, from a platform heading angle ($\psi_p(t)$) in a twelfth summation unit with a twelfth mean-forming unit associated therewith a mean-free platform heading value is calculated and from said value in a thirteenth summation unit the drift angle ($\psi_D(t)$) is subtracted to generate the necessary yaw angle ($\psi(t)$) and then applied to the rotational matrix.

* * * * *